UNITED STATES PATENT OFFICE.

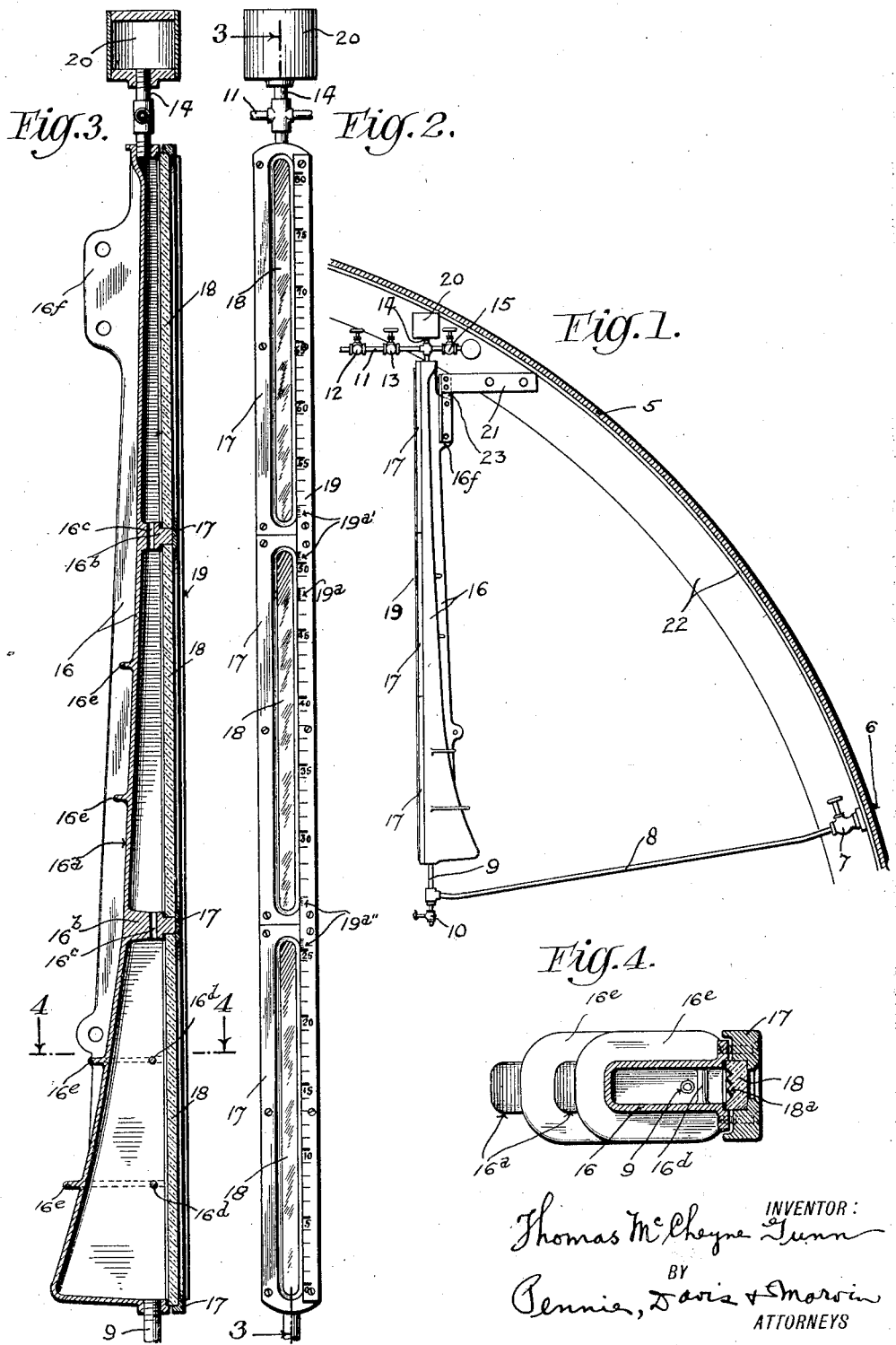

THOMAS McCHEYNE GUNN, OF NEW LONDON, CONNECTICUT, ASSIGNOR TO ELECTRIC BOAT COMPANY, A CORPORATION OF NEW JERSEY.

DEPTH-GAGE.

1,338,981.   Specification of Letters Patent.   Patented May 4, 1920.

Application filed July 7, 1916. Serial No. 107,917.

*To all whom it may concern:*

Be it known that I, THOMAS MCCHEYNE GUNN, a citizen of the United States and a resident of New London, in the county of New London and State of Connecticut, have invented certain new and useful Improvements in Depth-Gages; and I do hereby declare the following to be a full, clear, and exact description of the invention, such as will enable others skilled in the art to which it appertains to make and use the same.

The present invention relates broadly to submarine boats, and more particularly to improvements in depth gages for installation therein.

These gages give their indications due to the fact that they are constructed to respond to variations in submergence pressure. This submergence pressure, as is well known, increases uniformly as its point of application is more and more below the surface. The phenomenon may be expressed roughly according to the formula $F = \frac{p}{2}$, where F represents the depth in feet whereat the submergence pressure acts upon the sensitive element of the gage, and $p$ is the pressure in pounds per square inch. To obtain very accurate results, there is substituted for the "2" of the formula a familiar fraction slightly less than the value given; but for the purposes of the present disclosure the formula may be translated by stating that for every foot the vessel descends the pressure increases by half a pound.

A very important function that a gage of this sort must perform in a submarine boat is the indication of a change of depth as soon as such change occurs and without the slightest delay. In general, mechanical gages have been used; but all such instruments have had some friction, and therefore have not shown small differences of pressure or shown such differences without some delay. When a boat is balanced submerged, that is, when the vessel is stationary,—its ability thus to remain for a certain length of time forming a recognized feature of trial tests,—it is important that a change of depth be indicated with the promptness mentioned, since then a very little water pumped into or out of the tanks will check the unbalancing movement provided the pumping be done immediately. An instrument that is not free from friction is therefore not of much value in such a situation.

To satisfy the conditions described, thought has been given to the provision of an upright tube the lower end of which is open to the sea, so that as the sea water exerts pressure directly against a trapped compressible fluid in the upper part of the tube, or indirectly against an intermediate fluid, as a collection of mercury or the like, a calibrated scale associated with the tube coöperates with a visible liquid level. Such an arrangement, however, although preferable over the mechanical gages aforesaid, is unsatisfactory because tubes of constant cross-section have been employed and consequently graduations on the scale have not been uniformly spaced. The resistance to compression of the trapped fluid in the upper part of such a tube increases so much more rapidly than the increase in pressure as the submarine descends foot by foot below the surface, that these graduations, very far apart at the lower portion of the tube, must be arranged closer and closer together as the depth scale runs up alongside of the tube, until they become so crowded that even with close observation accurate submerged balancing, or even the maintenance of an even keel during submerged running, is almost impossible.

According to the present invention there is provided, not a tube of the same bore throughout, but an elongated chamber having its lower end open to the sea at a point on the hull preferably located so that with the boat on the surface said point would lie within the surface plane of the sea. At the top of the chamber and opening into the same is a chest which may contain air under pressure. A transparent pane is preferably fitted alongside of the elongated chamber so that the water level therein may be observed. In order to associate with the chamber a scale the graduations of which shall be uniform or substantially so, the cross-sectional area of the chamber gradually increases from top to bottom thereof, according to a peculiar curve. In practising the invention, this curve has been made to follow a parabola, and has then given good results as to uniformity of spaces between graduations where each space represented a foot of depth below the surface.

In the accompanying drawings,

Figure 1 is a side elevation of a preferred embodiment of a depth gage constructed in accordance with the invention installed in a submarine boat, the hull of the boat being shown in section;

Fig. 2 is a front elevation of the gage;

Fig. 3 is a sectional view taken on the line 3—3 of Fig. 2; and

Fig. 4 is a sectional view taken on the line 4—4 of Fig. 3.

Referring now to Fig. 1, the hull section is shown at 5. At a point on the hull intersected by a boundary of the water plane area of the submarine when trimmed and floating for surface propulsion, there is provided an opening 6 open to the sea and served by the globe-valve 7. Leading from the valve is a pipe 8 which taps into a pipe 9, the upper end of pipe 9 communicating with the lower interior of the gage. Below the point of junction between pipes 8 and 9, the latter carries a pet-cock 10 so that the interior of the gage may be drained when desired.

A connection 11 from the usual 100 lb. air line, having interposed therein a plurality of individually adjustable reducing valves 12 and 13, taps into a short tube 14 forming a part of the gage proper. A second connection from said air line, having interposed therein a similar reducing valve 15, also taps into said short tube.

Referring next to Figs. 2 to 4 inclusive, the gage proper includes, in addition to the short tube 14, the following parts. The elongated chamber mentioned is established by a main or box-casting 16, and three cover-plates 17 therefor each having fitted therein a transparent pane 18. These panes are preferably formed of what is known as reflex-glass, with the reflex-striations vertical and parallel as indicated at $18^a$ in Fig. 4. Mounted on the plate 17 is a graduated scale 19, the numerals carried by the scale expressing depth in feet relatively to the water-level seen through one of the panes 18; this water-level being always clearly visible on account of the well known action of the reflex-striations carried by the panes. Between each two integer-graduations $19^a$ (every fifth one of such graduations being marked with its true value in feet) the scale is preferably provided with a plurality of fraction-graduations, one of such pluralities being illustrated at $19^{a'}$. That is, with ten of such fraction-graduations between each integer-graduation and the one immediately above it, a rise of water-level within the elongated chamber through the height measured by two adjacent fraction-graduations would represent a descent of the submarine by one-tenth of a foot and a rise in submergence pressure of one-twentieth of a pound.

The back wall $16^a$ of casting 16 has its inner surface so curved that, allowing for the presence of transverse webs $16^b$ and communicating ports $16^c$, and allowing for the fact that the width of the chamber is constant, the rise of water within said chamber will be substantially uniform in accordance with uniformly increasing submergence pressures, except that by virtue of the presence of such webs fraction-graduations as indicated at $19^{a'}$ and at $19^{a''}$ may also be effective even between the integer-graduation 25 and the one immediately above it and between the integer-graduation 50 and the one immediately above it.

A gage of the relative proportions shown in the drawing will allow approximately equal graduations of the scale, but the exact shape is not important, for the water chamber is usually of cast metal and consequently not accurate, so that each instrument is individually calibrated by immersing it to measured depths and placing the scale marks accordingly.

Inner lateral strengthening rods $16^d$ are provided, one located opposite each of the two lower of the outer lateral strengthening ribs $16^e$.

The upper end of pipe 9 is threaded into the lower end of casting 16, and the lower end of short tube 14 is threaded into the upper end of said casting, the upper end of the short tube being threaded into the lower portion of a compression chest 20 built up as indicated.

The gage may be fixedly mounted in the hull 5 as illustrated by means of bolting one end of the strap 21 to one of the vessel's angle-iron ribs 22 and by bolting the other end of the strap to a plate 23 which is in turn bolted to an ear $16^f$ formed in rear of the elongated chamber's casting 16.

As the result of suitably adjusting the reducing valves 12, 13 and 15, air from the 100 lb. line, which when trapped in compression chest 20 is adapted to act as the compressible fluid against the resistance to compression of which the sea water in the elongated chamber must rise, may be so controlled that the numerals associated with the integer-graduations on the panes 18 will represent actual depths in feet, or fractions or multiples of such actual depths. In the present instance, the parts are so designed that with a certain air pressure constantly maintained in the compression-chest 20 a water-level rise within the elongated chamber, from say the graduation 70 to the graduation 80, will indicate that the vessel has just descended from a depth below the surface of seventy feet to a new depth of eighty feet. If the boat descend farther, and if the air pressure in the compression chest be not changed, the gage will have reached its limit of operation. It is entirely practicable, however, to readjust the gage for a new range of indications, merely as the result of readjusting the reducing valves 12, 13 and 15 so as to increase the air pressure within the compression chest 20 sufficiently to depress the water-level in the elongated chamber to lie somewhere below the graduation 80. Accordingly, in actual installations, it has been the custom to maintain the air pressure so that during the first eighty feet of submergence the scale is a true one, and then to increase the air pressure so that at this submergence the water-level descends to the graduation 0. Thereafter, as the boat descends from a depth of eighty feet to a new maximum of one hundred and sixty feet, each graduation will of course give a value equal to its own reading plus eighty. This procedure, repeated it may be several times, permits a vessel to submerge say to the extent of two hundred feet, without necessitating a physical extension of the elongated chamber beyond a practical and convenient limit.

I claim:

1. In a depth gage, an elongated chamber for the reception of fluid, said chamber comprising one wall curved to provide a gradually diminishing cross-sectional area longitudinally of the chamber and another of said walls being plane and having a transparent portion and a substantially evenly graduated scale carried by said chamber adjacent said transparent portion, said chamber having transverse partitions at intervals longitudinally thereof with passages therethrough allowing the passage of the liquid from one part of the chamber to another.

2. In a depth gage, an elongated chamber for the reception of fluid, said chamber comprising one wall shaped to provide a gradually diminishing cross-sectional area longtiudinally of the chamber, spaced transverse partitions at intervals in said chamber, and a transparent wall for said chamber whereby the liquid level in the chamber can be observed there being scale marks along said transparent wall, and the shape of the chamber walls being such that the cross-sectional area immediately above and below each transverse partition shall be substantially equal.

3. A depth gage for use in submarine boats, including, in combination, a vertically elongated chamber, means for admitting sea water to the chamber adjacent one end thereof, a compression chest the interior of which is in communication with the interior of the elongated chamber whereby a compressible fluid under a predetermined pressure may be trapped in the chest and in the chamber, there being a scale adjacent to the elongated chamber and graduated substantially evenly for even submergence pressures, the cross-sectional area of the elongated chamber increasing from a point adjacent to the compression chest to a point adjacent to said means whereby the water-level within the elongated chamber may read truly upon any one of the graduations, and means whereby the compressible fluid may be placed under abnormal pressure so proportioned that the water-level within the elongated chamber may read truly upon any one of the graduations when the latter is assumed to have a value equal to its normal value plus ×.

4. In a depth gage an elongated chamber for receiving the measuring fluid, said chamber having one wall curved to provide a gradually decreasing cross-sectional area, means for maintaining a trapped compressible fluid in communication with said chamber, said curved wall being shaped so that equal changes in level of the measuring fluid indicate substantially equal differences in depth at different points in the length of the gage, said chamber having a portion of one wall transparent, transverse stiffening webs at different points in the length of said chamber, said stiffening webs having passages for the measuring fluid and a scale adjacent said transparent portion, said scale having equally spaced indicating calibrations with spaces of greater length between the calibrations on either side of said stiffening webs.

5. In a depth gage an elongated chamber for the measuring fluid, an entering port for the fluid at the lower end of said chamber, means for retaining a trapped compressible fluid at the opposite end of the gage, said chamber for the measuring fluid being of varying cross-section, whereby equal rises in level at different points in the length of said chamber indicate substantially equal changes in depth, and means whereby said retaining means for the compressible fluid may be charged with fluid under pressure or exhausted of fluid to thereby vary the initial working pressure of the trapped fluid for different ranges of depth to be measured.

In testimony whereof I affix my signature.

THOMAS McCHEYNE GUNN.